United States Patent [19]
Morgan

[11] Patent Number: 5,251,918
[45] Date of Patent: Oct. 12, 1993

[54] THREE JAW CHUCK STOP SYSTEM

[76] Inventor: William E. Morgan, 1640 Sumner St., Longmont, Colo. 80501

[21] Appl. No.: 956,118

[22] Filed: Oct. 5, 1992

[51] Int. Cl.⁵ .............................................. B23B 13/12
[52] U.S. Cl. ..................................... 279/156; 82/155; 279/110
[58] Field of Search .................. 82/153, 155; 279/110, 279/156

[56] References Cited
U.S. PATENT DOCUMENTS

| | | | |
|---|---|---|---|
| 2,415,482 | 2/1947 | Greenough | 279/50 |
| 2,650,098 | 8/1953 | Darling | 279/156 X |
| 2,756,059 | 7/1956 | Knapp | 279/156 |
| 3,472,105 | 10/1969 | Ono | 279/156 X |
| 3,540,748 | 11/1970 | Buck | 279/156 X |
| 4,838,562 | 6/1989 | Akashi | 279/106 |
| 5,058,467 | 10/1991 | Hoff et al. | 279/156 |

Primary Examiner—Timothy V. Eley
Attorney, Agent, or Firm—Patent Law Offices of Rick Martin

[57] ABSTRACT

In a three jaw chuck the traditional chip guard is replaced by a stop guard having internal threads. An extension tube is threaded to the stop guard forming an adjustable length cylinder. An idler is optionally mounted inside the extension tube(s) to stabilize the work piece. A stop assembly is screwed into either the stop guard or the extension tube(s). The stop assembly has an adjustable stop bolt enabling the positioning of the stop at any position ranging from the jaw face to the end of the last extension tube.

14 Claims, 6 Drawing Sheets

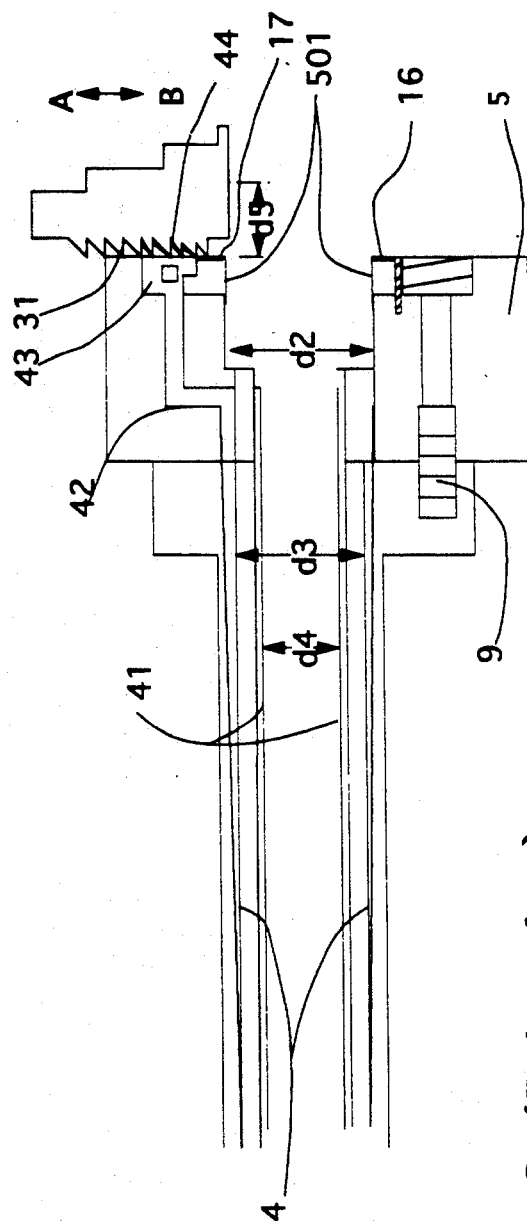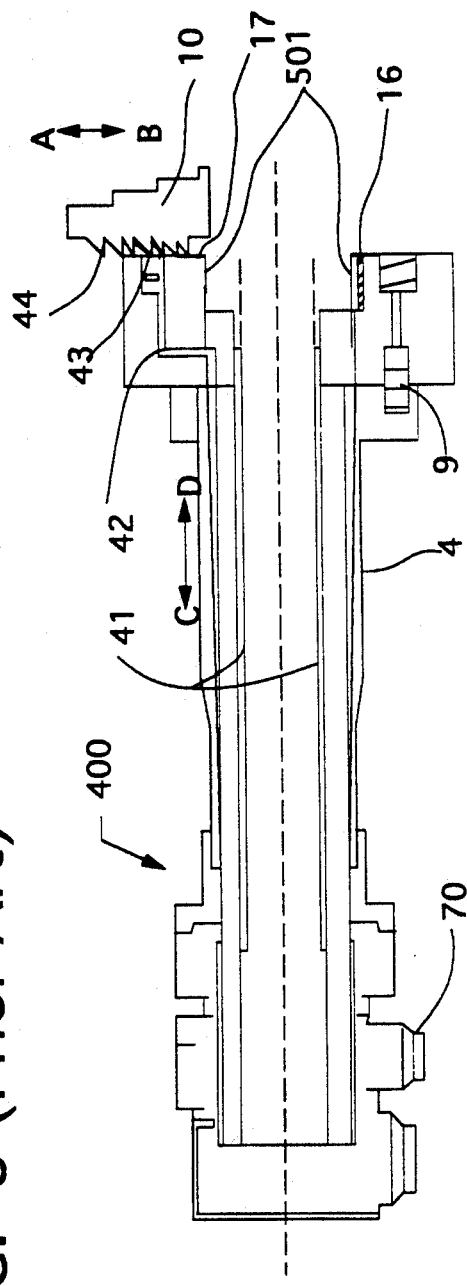
FIG. 3 (Prior Art)
FIG. 4 (Prior Art)

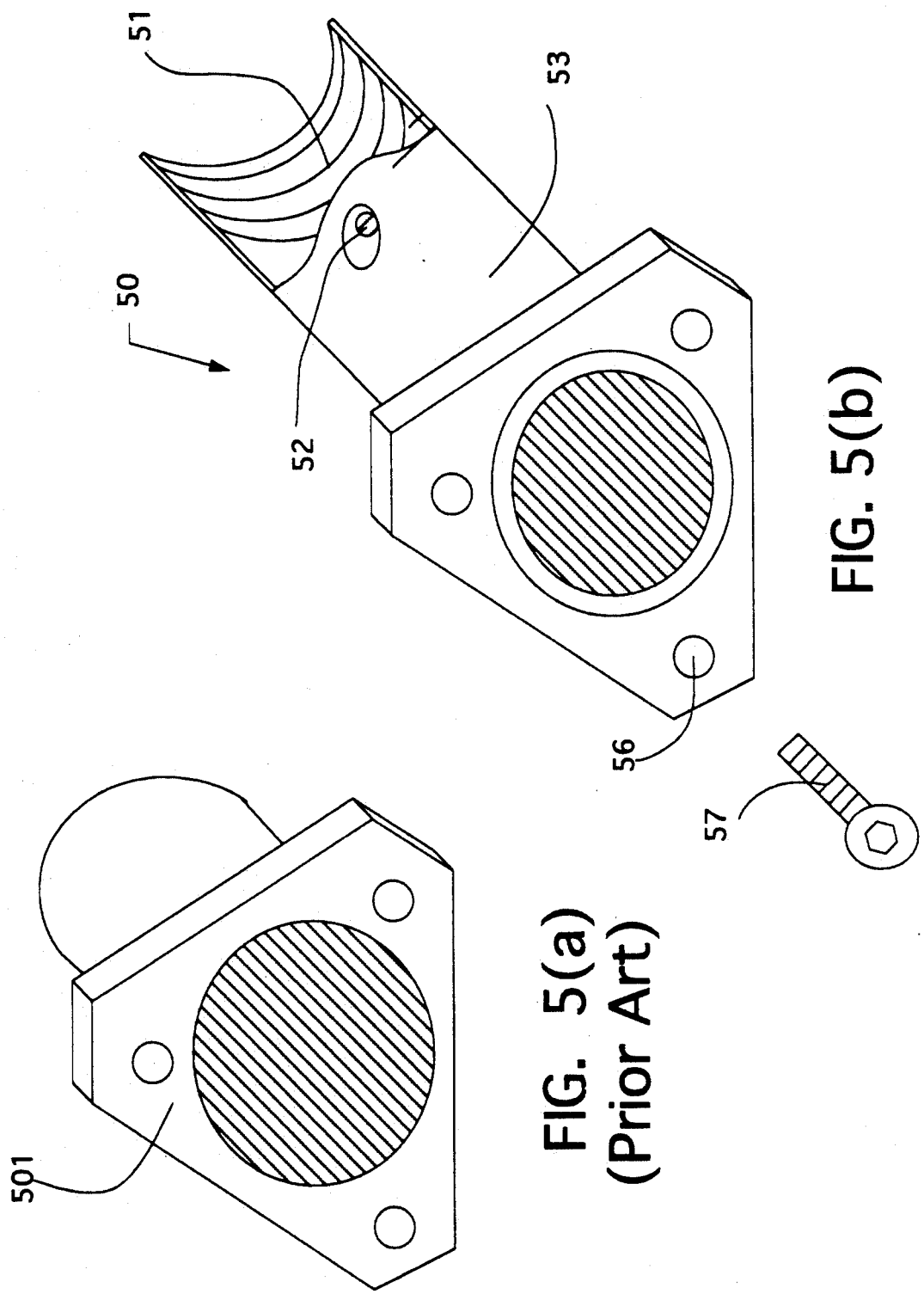

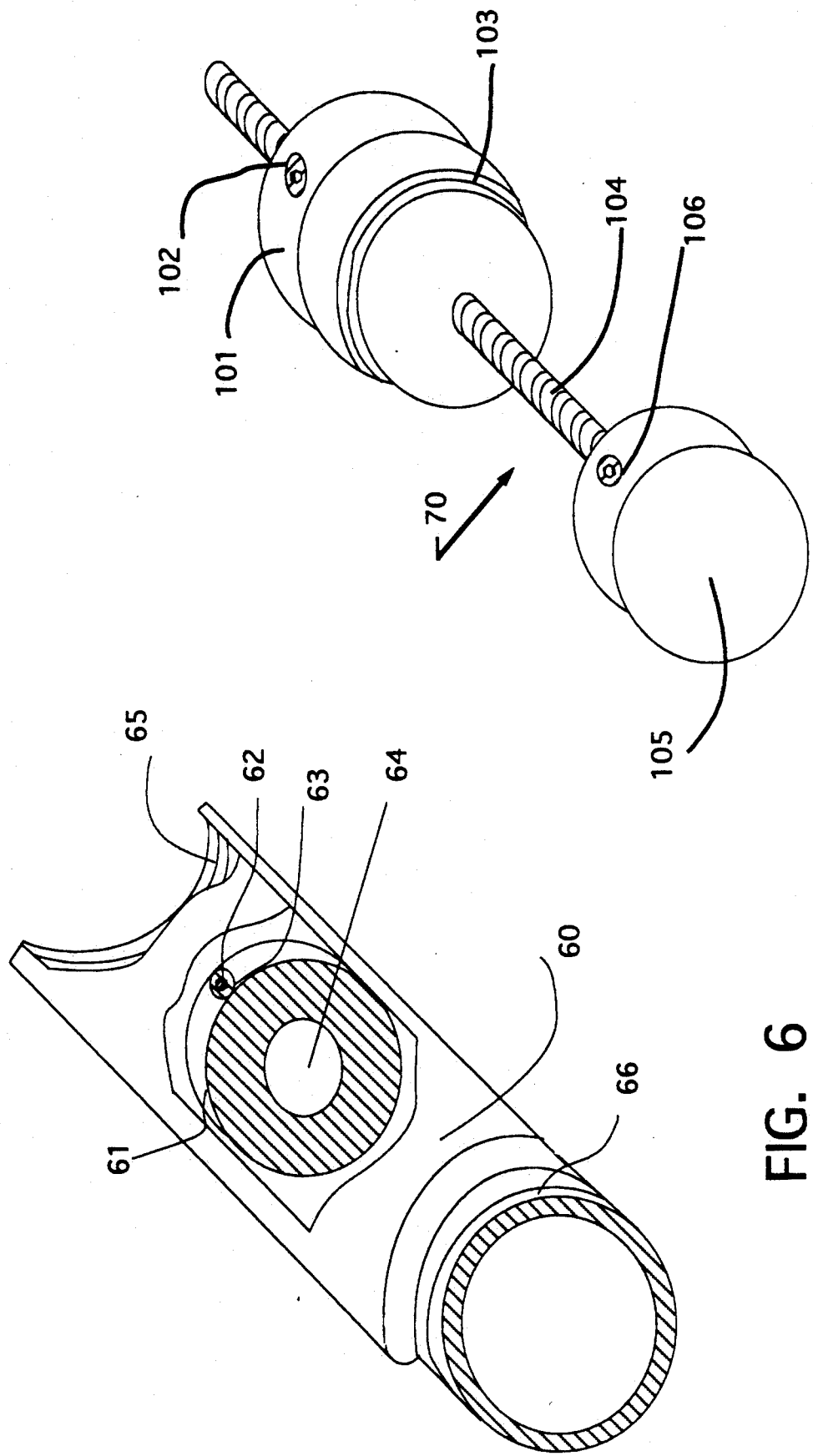

THREE JAW CHUCK STOP SYSTEM

FIELD OF THE INVENTION

The present invention relates to mounting improvements especially stops for three jaw chucks.

BACKGROUND OF THE INVENTION

Three jaw chuck systems such as the CNC Lathe/Turning Center SL-45 Senes by Mori Seiki, have the capability of handling high speed lathe machining of most materials. In some operations, a work piece is mounted down through the chuck extending several feet to the left of the chuck, while the machining is done to the right of the chuck. One common operation is the facing of a work piece to a precise length to within several millimeters. The best way to accomplish this task is to affix an adjustable position stop to the left of the spinning chuck inside the rotating spindle. A numerically controlled computer (NC) lathe or manual lathe then faces the work piece at a precise distance from the stop each time. Rapid mounting and dismounting of each work piece is possible.

The only known adjustable stop for a three jaw chuck is made by the J.F. Berns Co., Inc. of Cinncinnati, Ohio. The model SS200 has a shaft clamp affixed to the outside left cabinet of the CNC lathe.

The shaft clamp holds an adjustable insertion length shaft up inside the spindle of the lathe to the desired stop position. A bearing unit is rotatably mounted at the work piece end of the adjustable length shaft. Drawbacks of this system include the extension of the adjustable insertion length shaft out into the shop floor when a long work piece is mounted. Also the stop cannot be located in the space between the jaws when the work piece has a smaller diameter than the inside diameter of the spindle. The rotating bearing unit fits the inside diameter of the spindle, and is not interchangeable. Another disadvantage is the high cost of the rotating bearing unit, and the high cost associated with its maintainability. The bearing unit is subjected to cooling liquids and metal particle penetration.

The present invention has no moving parts, and is thus more economical to use. Also the present invention can utilize the space inside the jaws for locating the stop. The present invention saves shop floor space since it is comprised of multiple extension units which are assembled to the desired length to position the stop. It never extends into the shop floor.

SUMMARY OF THE INVENTION

The main object of the present invention is to provide a work piece stop on a three jaw chuck at any point ranging from the surface of the jaws to the outside housing of the lathe.

Another object of the present invention is to provide said stop with a chuck-mounted stop guard for supporting said stop, thereby eliminating any moving parts.

Another object of the present invention is to provide extension units for the stop guard, thereby enabling the stop support to be incrementally built to any desired length.

Another object of the present invention is to provide a work piece idler, thereby further supporting the work piece and preventing wobble Other objects of this invention will appear from the following description and appended claims, reference being had to the accompanying drawings forming a part of this specification wherein like reference characters designate corresponding parts in the several views.

BRIEF DESCRIPTION OF THE DRAWINGS

FIG. 3 is a sectional view of the three jaw chuck taken along line 3—3 of FIG. 2.

FIG. 4 is a sectional view of the spindle area taken along line 4—4 of FIG. 1.

FIG. 5 (a) is a side plan view of the chip guard 20 shown in FIG. 2.

FIG. 5 (b) is a side plan view of the stop guard 50 which replaces the chip guard 20 in FIG. 5 (a).

FIG. 6 is a side perspective view of an extension tube with a partial cutaway showing an idler.

FIG. 7 is a side perspective view of the stop assembly.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE PREFERRED EMBODIMENTS

Figure 1:
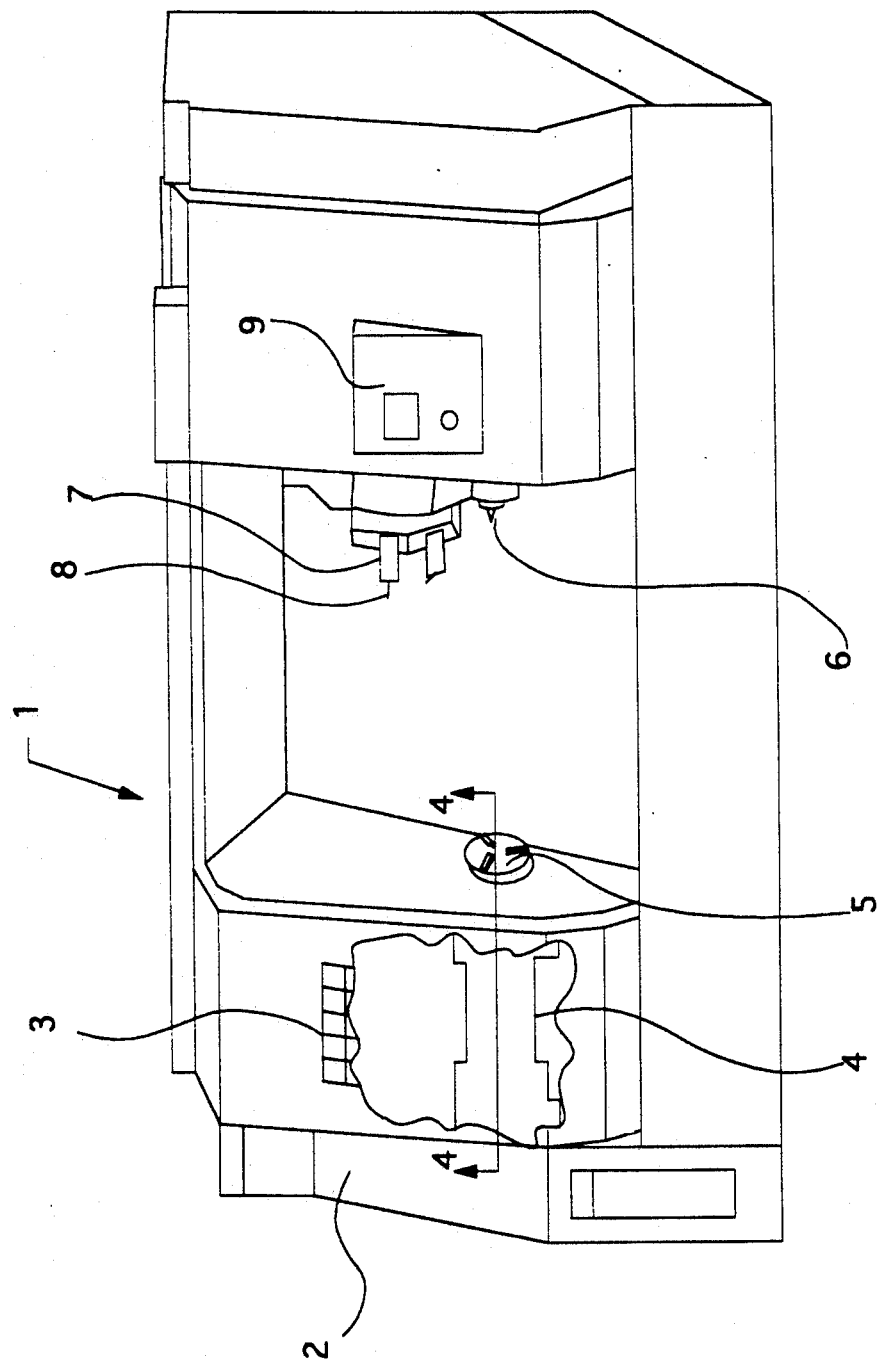
FIG. 1 is a front perspective view of a CNC lathe with a partial cutaway of the spindle casing.

Referring first to FIG. 1 a computer numerically controlled (CNC) lathe 1 has a housing 2, a spindle area 3, a spindle 4, a three jaw chuck 5, a tail stock 6, a multi turret head 7, a facing tool 8, and a computer 9. In operation a work piece (not shown) can be mounted between the three jaw chuck 5 and the tail stock 6. The computer 9 is given instructions for various tools in the multi turret head 7 to shape the work piece at various locations. Nearby the multi turret head 7 is a fluid coolant ejector which sprays fluid on the work piece during machinery.

Certain operations including facing the end of a cylindrical work piece with facing tool 8, require mounting the work piece inside the three jaw chuck and down into the spindle 4. The tail stock 6 is not used. The facing tool 8 shaves the end of the work piece at a precise distance from the length of the work piece protruding from the three jaw chuck 5.

If multiple rods needed facing at precisely the same length, then traditionally each rod would be mounted to protrude a precise distance from the three jaw chuck 5. This requires measuring and marking each rod.

Figure 8:
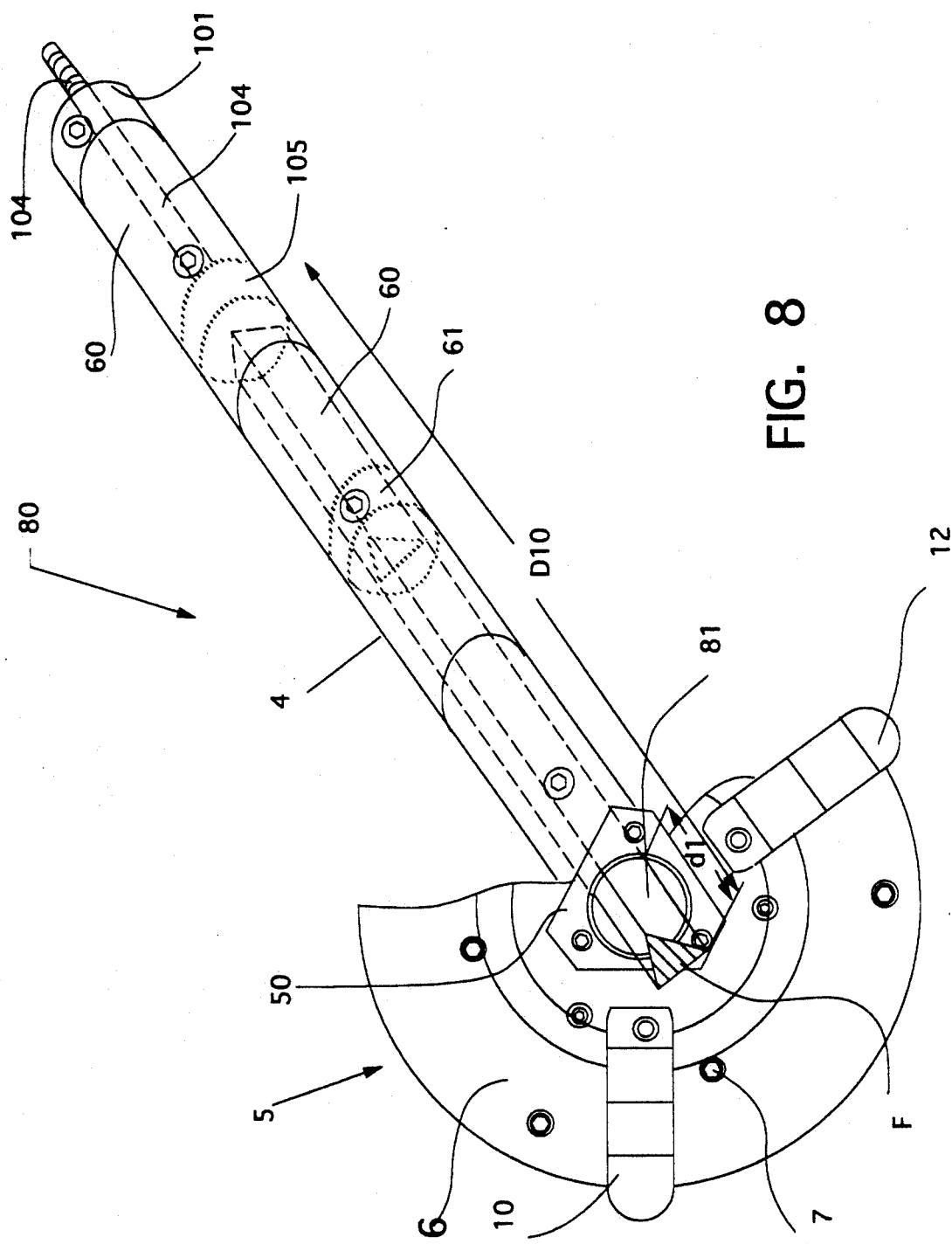
FIG. 8 is a sectional view of a spindle having a stop assembly mounted to an extension tube mounted to a stop guard.

Referring next to FIG. 8 in the present invention a stop 105 is mounted inside the spinning spindle 4 by means of a stop guard 50 (FIG. 5(b)), an extension tube 60 (FIG. 6) and a stop lock assembly (FIG. 7). The members 50, 60, 70 form an adjustable stop assembly 80 as shown in FIG. 8. Thus, the rod 81 in FIG. 8 can be quickly mounted in the three jaw chuck 5 while butted against the stop 105. The length $d_1$ that rod 81 protrudes from the three jaw chuck 5 is always constant. Therefore, the present invention saves the time measuring each work piece for obtaining a constant distance $d_1$.

Figure 2:
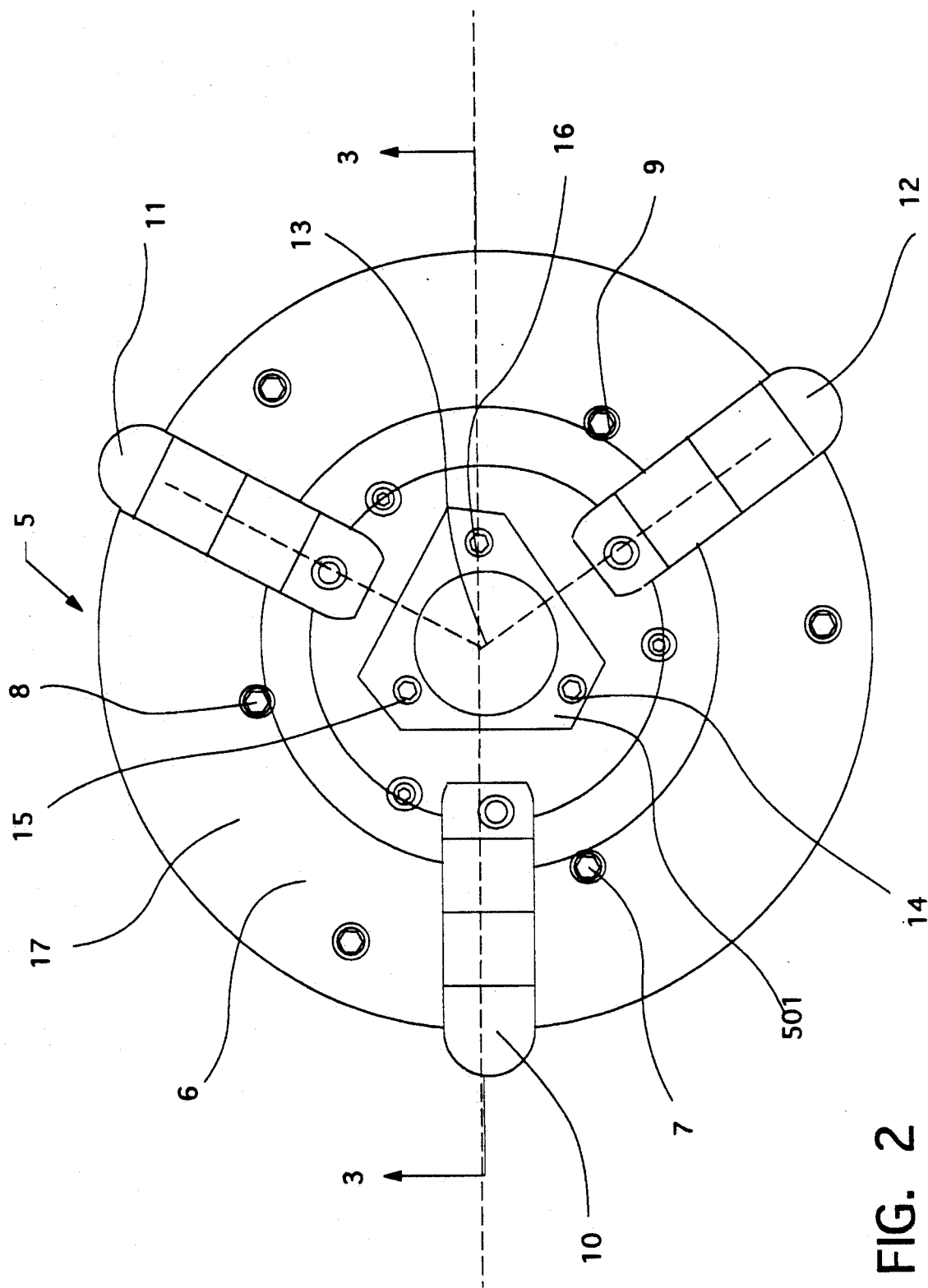
FIG. 2 is a front plan view of a three jaw chuck having a removable chip guard.

Referring next to FIG. 2 the three jaw chuck 5 has a face 6, mounting bolts 7, 8, 9, jaws 10, 11, 12, hollow area 13, and a chip guard 501 (as shown in FIG. 5(a)). Chip guard 501 is fastened to the face 17 of three jaw chuck 5 with screws 14, 15, 16, thus preventing cooling fluid from entering the core of the three jaw chuck 5 as seen in FIG. 3.

FIG. 3 shows a traditional hydraulic closing mechanism for the three jaw chuck 5. Jaw 10 moves in either direction A or B by means of linkage 42, 43 and gear teeth 44. A draw tube 41 is slidably mounted inside spindle 4 and is hydraulically powered to pull or push linkage 42, 43 to open or close jaw 10. A work piece may be mounted inside draw tube 41 up to a diameter size $d_4$.

The inside diameter of spindle 4 is $d_3$. The inside diameter of the three jaw chuck having chip guard 501 is $d_2$, wherein $d_2$ is larger than $d_3$ which is larger than $d_4$. The present invention allows a stop 105 to be mounted in space $d_5$, thus enabling the facing of a work piece shaped like a thick slug so long as the jaws 10, 11, 12 can bite into the work piece. This is true even when the jaws 10, 11, 12 are closed smaller than distance $d_4$.

In FIG. 4 the spindle assembly 400 houses the adjustable stop assembly 80 shown in FIG. 8. In operation the close actuator 70 hydraulically pulls the draw tube 41 which pulls linkage 42, 43 and closes jaws 10, 11, 12. The draw tube moves in direction C, D and the jaws in direction A, B. This is all standard in the art.

FIG. 5 (a) shows the chip guard 501 which is traditionally mounted flush with the face 17 of chuck 5 as shown in FIGS. 3, 4.

In the present invention, the chip guard 501 is replaced with a stop guard 50 as shown in FIG. 5(b). Screw 57 mounts through hole 56 into the chuck face 17. In an alternate embodiment for chucks not having a chip guard (including non-hydraulic manual tightening lathes) the chuck would be machined to accept the stop guard 50. The stop guard 50 has internal threads 51, and an idler lock hole 52 in the barrel 53. The threads 51 can be used either for mounting an extension tube 60 (FIG. 6) or a stop assembly 70 (FIG. 7).

Referring next to FIG. 6, the extension tube 60 is shown having an idler 61 mounted inside. A locking bolt 62 fits through the idler hole 63. Idler hole 64 supports a work piece (not shown). Extension tube 60 has internal threads 65 at one end and external threads 66 at the opposite end thereby enabling a series of coupled extension tubes to achieve the desired location for the stop assembly 70 shown in FIG. 7.

The stop assembly 70 in FIG. 7 is threaded either directly into the stop guard 50 (FIGS. 5(b), 8) or into an extension tube 60 (FIG. 6). The stop assembly 70 is comprised of a stop mount 101 having a locking bolt 102 and external threads 103. Threaded stop mount 104 is screwed into the center of stop mount 101. Stop 105 is removably affixed to threaded stop mount 104 by means of locking bolt 106. In operation, the threaded stop mount 104 is screwed into the stop mount 101 and locked into the desired position with locking bolt 102. Then, the stop assembly is screwed into the appropriate member, either the stop guard 50 or an extension tube 60.

Referring last to FIG. 8 a triangular work piece 81 is shown mounted against the stop 105 inside stop assembly 80. Jaws 10, 11, 12 hold the work piece 81 in place while idler 61 adds extra support. Work piece face F can be precisely machined thereby resulting in a precise work piece length, $D_{10}$. Multiple extension tubes 60 can be fitted together to any desired length.

It is obvious that the present invention is fully analogous in a manually closing jaw system. The chuck face would have to be counterbored to accept a stop guard.

Although the present invention has been described with reference to preferred embodiments, numerous modifications and variations can be made and still the result will come within the scope of the invention. No limitation with respect to the specific embodiments disclosed herein is intended or should be inferred.

I claim:

1. A stop for a three jaw chuck having a proximal face, said stop comprising:
   a stop guard;
   said stop guard further comprising means for mounting on said proximal face;
   a barrel having a distal end projecting distally from said stop guard;
   a stop mount removably affixed to said distal end;
   a threaded stop mount removably affixed to said stop mount which may be mounted projecting toward said proximal face; and
   a stop affixed to said threaded stop mount.

2. The stop of claim 1 further comprising an extension tube affixed between said barrel and said stop mount.

3. The stop of claim 2 further comprising an idler mounted inside said extension tube.

4. The stop of claim 1 further comprising an idler mounted inside said barrel.

5. In a lathe having a machine tool and a multiple jaw chuck mounting system for a work piece, said chuck having a face and a hollow core, said jaws each having a proximal face adjacent the machine tool of said lathe, the improvement comprising:
   a stop guard;
   said stop guard further comprising means for flush mounting against said chuck face, a barrel, and means for attachment at the distal end of the barrel;
   an extension tube having a distal end and a proximal end and means for mounting at each end;
   a stop mount assembly having a stop mount, a threaded stop mount, and a stop;
   said stop mount further comprising means for attaching to said distal end of said barrel of said stop guard or said extension tube, wherein said stop can be positioned at any point from said proximal face of said jaws distally to said distal end of said extension tube, thereby providing a solid, precisely positioned stop for said work piece.

6. The improvement of claim 5 wherein said means for flush mounting further comprises a face plate, a matching indentation for said face plate on said chuck face, and screws through said face plate into said chuck face.

7. The improvement of claim 5 where said stop mount means for attaching at the distal end of the barrel further comprises external threads of said stop mount matching internal threads on said distal end of said barrel.

8. The improvement of claim 7 wherein said stop mount means for attaching to said distal end of said barrel of said stop guard or said extension tube further comprises matching threads.

9. The improvement of claim 5 wherein said extension tube means for mounting at each end further comprises internal threads at one end and external threads at the opposing end.

10. The improvement of claim 5 wherein said extension tube further comprises an idler having a hole to support said work piece.

11. The improvement of claim 5 wherein said stop guard further comprises an idler having a hole to support said work piece.

12. The improvement of claim 5 wherein said stop further comprises means for removably mounting on said threaded stop mount.

13. The improvement of claim 5 wherein said stop mount means for attaching at the distal end of said extension tube further comprises external threads on said stop mount matching internal threads on said distal end of said extension tube.

14. A stop for a lathe and a three jaw chuck capable of rotating a work piece comprising:

a stop guard flush mounted to said chuck and projecting distally therefrom;

said stop guard further comprising a barrel having threads at its distal end;

said three jaw chuck further comprising jaws each having an outbound edge;

an extension tube having matching threads to said barrel; and a stop assembly having a stop mount having matching threads to said extension tube and said stop guard, a stop bolt threaded through the center of said stop mount, and a stop affixed to said stop bolt, whereby the extension tube and stop assembly are interchangeable with the stop mount, thereby providing a stop precisely positionable from the outbound edge of the jaws to the distal end of the extension tube.

* * * * *